United States Patent
Lv et al.

(10) Patent No.: US 12,247,642 B2
(45) Date of Patent: Mar. 11, 2025

(54) ONE-MOTOR-DUEL-DRIVE SYNCHRONOUS DRIVE DEVICE

(71) Applicant: DEWERTOKIN TECHNOLOGY GROUP CO., LTD., Jiaxing (CN)

(72) Inventors: Zuochao Lv, Jiaxing (CN); Long Li, Jiaxing (CN); Chunqi Chen, Jiaxing (CN); Baowei Xu, Jiaxing (CN); Yiting Ye, Jiaxing (CN); Bin Shen, Jiaxing (CN)

(73) Assignee: DEWERTOKIN TECHNOLOGY GROUP CO., LTD., Jiaxing (CN)

( * ) Notice: Subject to any disclaimer, the term of this patent is extended or adjusted under 35 U.S.C. 154(b) by 0 days.

(21) Appl. No.: 18/226,847

(22) Filed: Jul. 27, 2023

(65) Prior Publication Data

US 2023/0366449 A1 Nov. 16, 2023

Related U.S. Application Data

(63) Continuation of application No. PCT/CN2021/083030, filed on Mar. 25, 2021.

(51) Int. Cl.
| | |
|---|---|
| *F16H 1/22* | (2006.01) |
| *F16H 1/24* | (2006.01) |
| *F16H 57/039* | (2012.01) |

(52) U.S. Cl.
CPC .............. *F16H 1/222* (2013.01); *F16H 1/24* (2013.01); *F16H 57/039* (2013.01)

(58) Field of Classification Search
CPC .............. F16H 1/222; F16H 1/24; F16H 1/16; F16H 57/039

(Continued)

(56) References Cited

U.S. PATENT DOCUMENTS

| | | | | |
|---|---|---|---|---|
| 4,619,151 A | * | 10/1986 | Trachman ............. | F16H 63/304 74/89.17 |
| 8,171,823 B2 | * | 5/2012 | Koga ..................... | B60N 2/161 74/425 |

(Continued)

FOREIGN PATENT DOCUMENTS

| | | |
|---|---|---|
| CN | 101670793 A | 3/2010 |
| CN | 109567386 A | 4/2019 |

(Continued)

OTHER PUBLICATIONS

International Search Report of Corresponding Application No. PCT/CN2021/083030; Oct. 26, 2021; 4 Pgs.

(Continued)

*Primary Examiner* — Ha Dinh Ho
(74) *Attorney, Agent, or Firm* — Cooper Legal Group, LLC (57) ABSTRACT

The present application relates to one-motor-duel-drive synchronous drive device. The drive device includes: a housing, wherein the housing is hollow, a telescopic mechanism is connected to the housing, the telescopic mechanism includes a screw rod, and one end of the screw rod extends into the housing; a transmission mechanism, wherein the transmission mechanism comprises a first transmission component rotatably connected to an inner wall of the housing, a second transmission component is fixedly connected to the screw rod, and the first transmission component and the second transmission component are staggered gears engaged with each other; a linkage lever provided between the housings, wherein two ends of the linkage lever are connected to the first transmission component, respectively; and a drive mechanism configured to act on the linkage lever to rotate the linkage lever.

9 Claims, 7 Drawing Sheets

(58) Field of Classification Search
USPC .......................................................... 74/664
See application file for complete search history.

(56) References Cited

U.S. PATENT DOCUMENTS

| | | | | |
|---|---|---|---|---|
| 8,567,285 | B2* | 10/2013 | Fu | A47L 9/0433 |
| | | | | 74/665 GA |
| 8,674,572 | B2* | 3/2014 | Dietrich | H02K 11/21 |
| | | | | 74/25 |
| 9,243,700 | B1* | 1/2016 | DeBoth | F16H 37/0826 |
| 10,500,984 | B2* | 12/2019 | Hoffmann | B60N 2/166 |
| 11,303,019 | B2* | 4/2022 | Li | F16H 19/04 |
| 11,339,857 | B2* | 5/2022 | Lee | F16D 7/10 |
| 2015/0027247 | A1* | 1/2015 | Kamada | F25D 25/025 |
| | | | | 74/30 |

FOREIGN PATENT DOCUMENTS

| | | |
|---|---|---|
| CN | 209251922 U | 8/2019 |
| CN | 209467715 U | 10/2019 |
| CN | 110899863 A | 3/2020 |
| CN | 111706659 A | 9/2020 |
| CN | 111759082 A | 10/2020 |
| CN | 212155660 U | 12/2020 |
| CN | 212368572 U | 1/2021 |
| CN | 214534288 U | 10/2021 |
| EP | 0500187 A1 | 8/1992 |
| WO | 2020216186 A1 | 10/2020 |

OTHER PUBLICATIONS

Office Action received in corresponding Chinese patent application No. 202110168330.1, dated Dec. 23, 2024, 18 pages.

* cited by examiner

ONE-MOTOR-DUEL-DRIVE SYNCHRONOUS DRIVE DEVICE

CROSS-REFERENCE TO RELATED APPLICATION

This application is a continuation of PCT application serial no. PCT/CN2021/083030, filed on Mar. 25, 2021, which claims the priority and benefit of Chinese patent application serial no. 202110168330.1, filed on Feb. 7, 2021. The entireties of PCT application serial no. PCT/CN2021/083030 and Chinese patent application serial no. 202110168330.1 are hereby incorporated by reference herein and made a part of this specification.

TECHNICAL FIELD

The present application relates to the field of a driver, and more particularly, it relates to a one-motor-duel-drive synchronous drive device.

BACKGROUND ART

With a development of the society, an electric bed, an electric sofa and a medical bed all have a liftable function to meet various needs of a user at present. The electric bed, the electric sofa and the medical bed are provided with a linear driver, in which the linear driver includes a power supply and a telescopic mechanism, and the telescopic mechanism includes a screw rod, a screw rod nut, a pushing rod support and a telescopic rod. The screw rod is rotated by the power supply such as a motor, so that the screw rod nut drives the telescopic rod to ascend or descend. Therefore, the driver plays as an important role during use of an electric furniture. Under a condition that there are two drivers synchronously ascending or descending, two linear drivers are usually provided with a hall-sensor driver motor. When two drivers work at the same time, a CPU in a control box continually detects a hall sign of the driver motor and counts. When one hall value is different from the other, a speed of one motor having a higher hall value is reduced to be identical to the hall value in the other motor, so as to achieve a synchronization of the two motors, ensuring a stable and synchronous ascent or descent of the electric bed.

It is found that, the above related technology suffers from the following disadvantage: a control box having a software and a hardware is required to control the synchronization of two motors so as to realize synchronous ascent or descent of linear drivers, which, however, leads to a high cost.

SUMMARY

For the purpose of reducing a cost, the present application provides a one-motor-duel-drive synchronous drive device.

The one-motor-duel-drive synchronous drive device according to the present application adopts a technical solution as follows:

A one-motor-duel-drive synchronous drive device, including:
  a housing, wherein the housing is hollow, a telescopic mechanism is connected to a housing, the telescopic mechanism comprises a screw rod, and one end of the screw rod extends into the housing;
  a transmission mechanism, wherein the transmission mechanism comprises a first transmission component rotatably connected to an inner wall of the housing, a second transmission component fixedly connected to the screw rod, and the first transmission component and the second transmission component are staggered gears engaged with each other;
  a linkage lever, wherein the linkage lever is provided between the housings, and two ends of the linkage lever are connected to the first transmission component, respectively; and
  a drive mechanism configured to act on the linkage lever to rotate the linkage lever.

In the above technical solution, the drive mechanism rotates the linkage lever, the linkage lever rotates the first transmission component, the first transmission component, due to engagement with the second transmission, rotates the second transmission component, so that the screw rod is rotated around itself axial direction, and the transmission mechanisms at two ends of the linkage lever synchronously rotate the screw rod, thereby driving the telescopic mechanism to move along a linear direction, to realize synchronous ascending or descending of the two telescopic mechanisms, maintain a consistence, while reducing the cost.

In some embodiments, the drive mechanism is provided at one end adjacent to the linkage lever and comprises a rotating motor, a first engaging component is fixedly connected to an output shaft of the rotating motor, a second engaging component is rotatably connected in the housing, the second engaging component is engaged with the first engaging component, a third is rotatably connected in the housing, and the third engaging component is fixedly connected to the second engaging component and is engaged with the first transmission component.

In the above technical solution, the rotating motor rotates the first engaging component, the second engaging component rotates the third engaging component, and the third engaging component rotates the first transmission component, so that the linkage lever may synchronously rotate the screw rod connected to the other end of the linkage lever, thereby two telescopic mechanisms ascending or descending synchronously.

In some embodiment, the transmission component comprises a face tooth and a helical tooth, the helical tooth is rotatably connected in the housing, fixedly connected to the face tooth, and is engaged with the third engaging component, and the face tooth is engaged with the second transmission component.

In the above technical solution, the rotating motor rotates the third engaging component, the third engaging component rotates the bevel tooth, and the helical tooth rotates the face tooth, so that the linkage lever synchronously rotates the screw rods at two ends of the linkage lever and two telescopic mechanisms ascends or descends synchronously.

In some embodiments, both the bevel tooth and the first transmission component are defined with a non-circular hole, the linkage lever is inserted and fixed in the non-circular hole, and the linkage lever has a cross section matching with the non-circular hole.

In the above technical solution, the linkage lever synchronously rotates two screw rods more stably during rotation.

In some embodiments, the linkage lever comprises a connecting rod connected to two housings, and a flexible coupling is connected between the connecting rods.

In the above technical solution, two connecting rods are kept concentric by connecting to the flexible coupling/universal coupling, so that the connecting rod are kept consistent during rotation, reducing a vibration of the connecting rods during rotation, and enabling the connecting rods to drive the two telescopic mechanisms to ascend or descended more stably.

In some embodiments, the linkage lever comprises rigid rods or flexible rods connected between the housings.

In the above technical solution, a flexible shaft of the flexible rod has properties of elasticity and low rigidity, so that vibration can be reduced, synchronization can be improved, and two telescopic mechanisms can synchronously ascend or descend more stably.

In some embodiments, a braking component sleeved on an output shaft of the rotating motor is connected to the housing, and the braking component is elastic and configured for applying a braking force opposite to a rotating direction of the output shaft of the rotating motor to the output shaft of the rotating motor.

In the above technical solution, when the rotating motor is stopped, the output shaft of the rotating motor still has a continuous-rotation tendency due to an inertial force, and the braking component applies a braking force opposite to the rotating direction of the output shaft of the rotating motor, so that a braking time of the output shaft of the rotating motor can be shortened, and the first engaging component may be stopped stably.

In some embodiments, the drive mechanism includes a driving motor, a first driving component is fixedly connected to an output shaft of the driving motor, a second driving component is fixedly connected to the linkage lever, and the first driving component is engaged with the second driving component.

In the above technical solution, the driving motor rotates the first driving component by starting the driving motor. Since the first driving component is engaged with the second driving component, the second driving component synchronously rotates the connecting rod.

In some embodiments, the first driving component and the second driving component are staggered gears.

In some embodiments, the first engaging component and the second engaging component are staggered gears.

DETAILED DESCRIPTION

The present application is further described in detail below in combination with FIGS. 1-7.

A linear driver includes a power supply and a telescopic mechanism, the telescopic mechanism includes a screw rod, a screw rod nut, a pushing rod support and a telescopic rod, and the screw rod is rotated by the power supply such as a motor, so that the screw rod nut drives the telescopic rod to ascend or descend.

A one-motor-duel-drive synchronous drive device is disclosed in embodiments of the present application.

Embodiment 1

Figure 1:
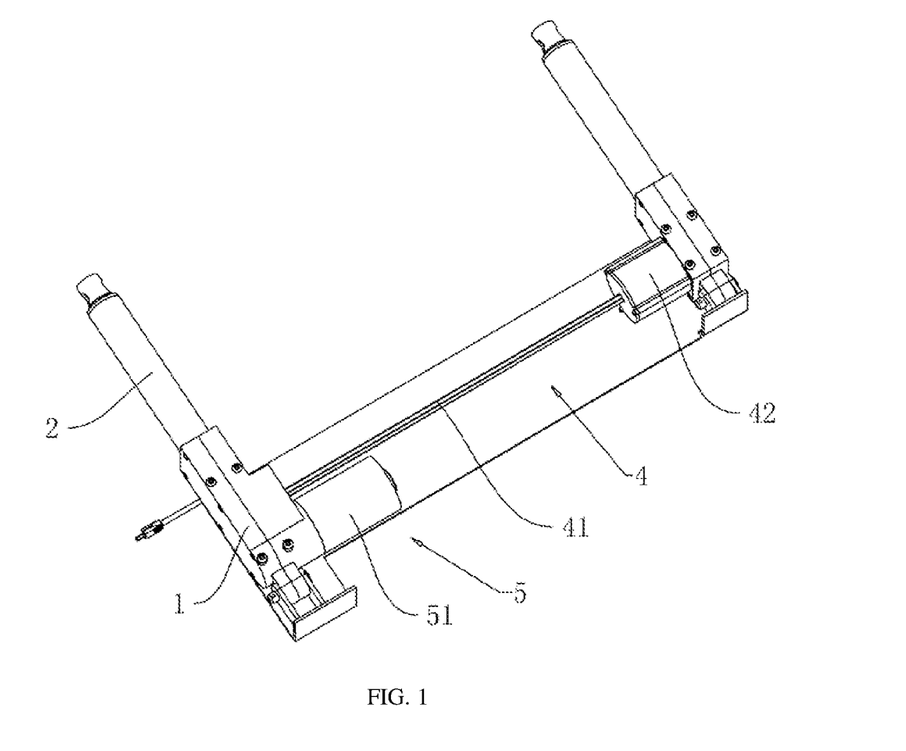
FIG. 1 is a schematic illustration of an overall structure of Embodiment 1.
Figure 2:
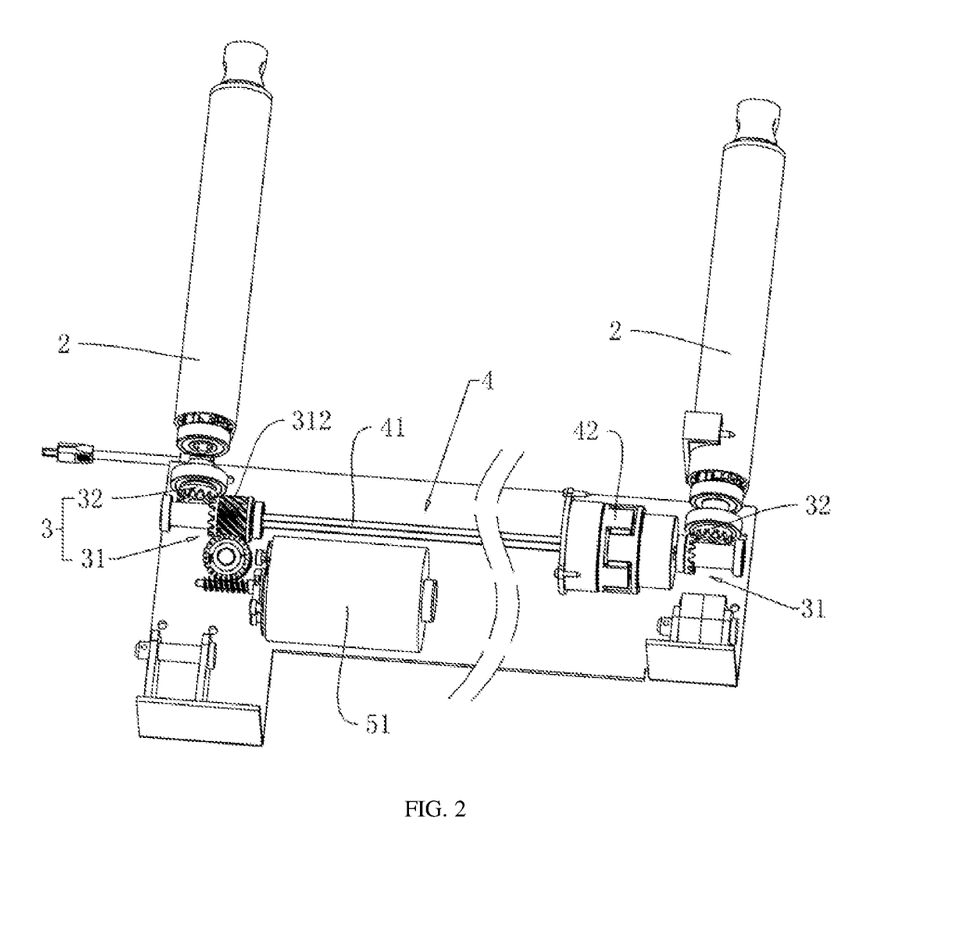
FIG. 2 is a schematic illustration of interior structure of a housing in Embodiment 1.

Referring to FIGS. 1-2, a one-motor-duel-drive synchronous drive device includes two hollow housings 1. A telescopic mechanism 2 is fixedly connected to the housing 1, in which the telescopic mechanism 2 may be fixed on the housing 1 via a screw, or may be fixed in the housing 1 via a slot defined on a side wall of the housing 1. The telescopic mechanism 2 includes a screw rod, in which one end of the screw rod extends into an inner cavity of the housing 1. A transmission mechanism 3 is provided in the two housings 1, respectively, and connected to one end of the screw rod. A linkage lever 4 is connected between two housings 1, two ends of the linkage lever 4 are connected to the transmission mechanism 3 respectively, and a drive mechanism 5 is fixed on one of the housings 1 and connected to one end of the linkage lever 4 to rotate the linkage lever 4. In some embodiments, two housings 1 may be connected as a whole body via a connecting plate, or two housings 1 and a connecting plate are integrally molded as a whole body, thereby ensuring a concentricity of the linkage lever 4, so as to reduce vibration of the linkage lever 4 and two housings 1.

When the drive mechanism 5 rotates the linkage lever 4, the linkage lever 4 synchronously rotates the transmission mechanism 3 in two housings 1, so that the transmission mechanism 3 drive two telescopic mechanisms 2 to ascend or descend synchronously. Therefore, what is needed is a switch frame fixed in any one of the telescopic mechanisms 2, and two microswitches provided on the switch frame and configured to control a largest extension length and a smallest extension length of the telescopic mechanism 2.

Figure 3:
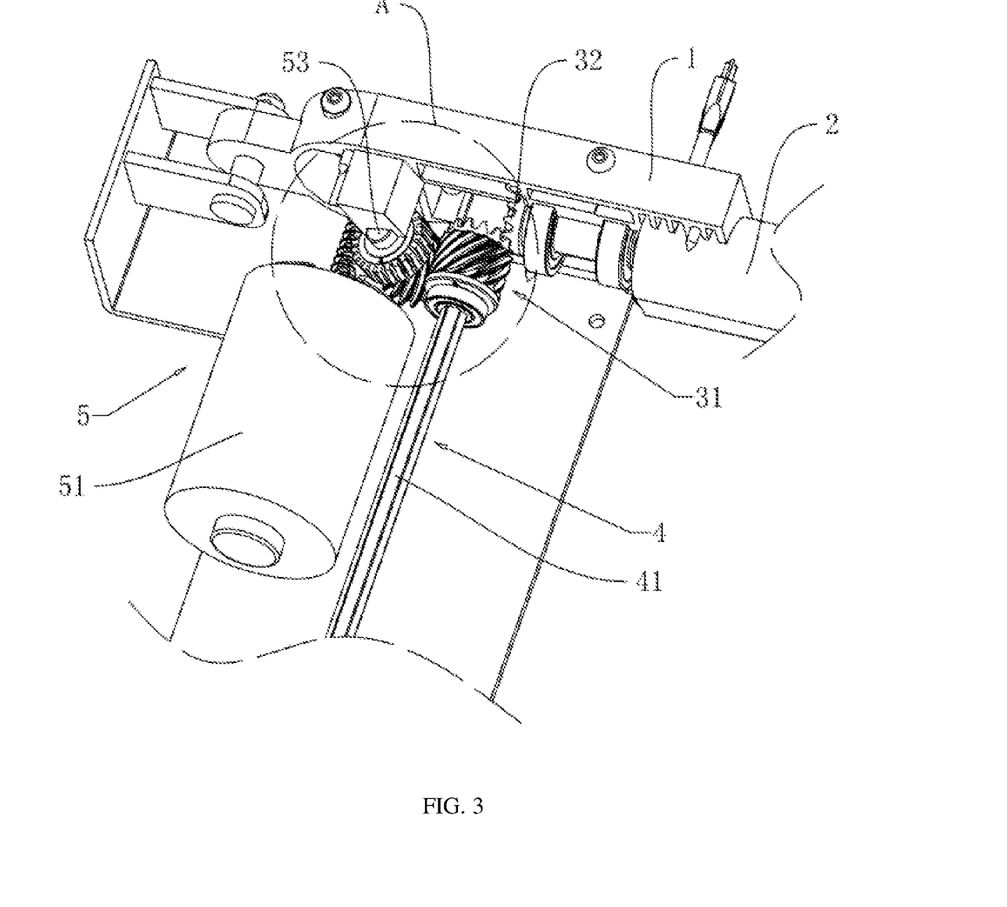
FIG. 3 is a schematic illustration of a drive mechanism in Embodiment 1.

Referring to FIGS. 2-3, taking one group of the transmission mechanisms 3 as an example for explanation, the transmission mechanism 3 includes a first transmission component 31 connected in the housing 1, the first transmission component 31 is supported on the housing 1 by a rotation of the bearing, a second transmission component 32 is fixedly connected to one end of the screw rod extended into the housing 1, the first transmission component 31 and the second transmission component 32 are staggered gears engaged with each other, and an axis of the first transmission component 31 is intersected with an axis of the second transmission component 32. In some embodiments, the axis of the second transmission component 32 is perpendicular to the axis of the first transmission component 31, and two ends of the linkage lever 4 are connected with the first transmission components 31 in two housings 1, respectively.

To limit an axially movement of the second transmission component 32 along the screw rod, in this embodiment, the second transmission component 32 is riveted with the screw rod. In other embodiments, the second transmission component 32 may be connected to the screw rod by a screw provided on an end face, so that the second transmission component 32 and the screw rod are connected as a whole body.

Figure 4:
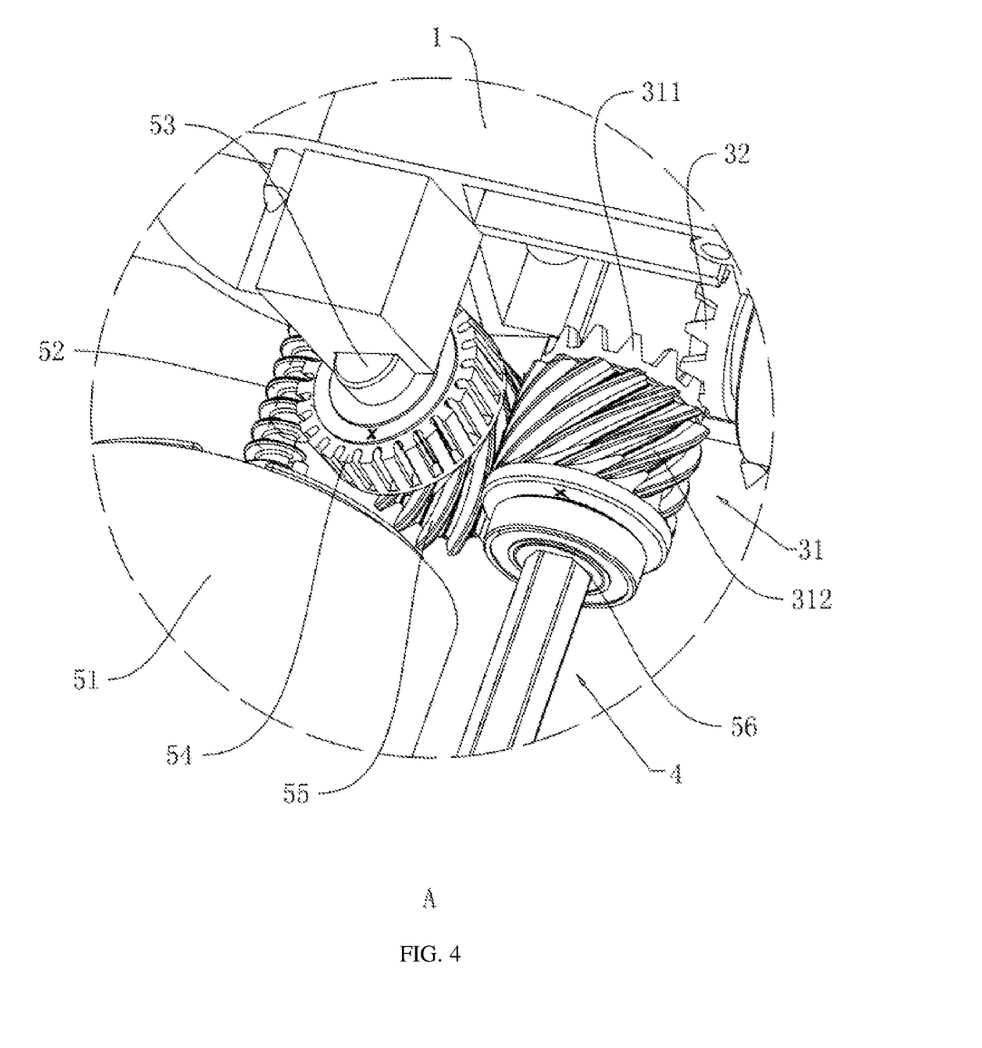
FIG. 4 is an enlarged structural diagram of portion A of FIG. 3.

Referring to FIG. 4, the drive mechanism 5 includes a rotating motor 51 fixedly connected to one of the housings 1, the rotating motor 51 is fixedly connected to housing 1 via a screw, and located at one end of the housing 1 departing from the telescopic mechanism 2, and a first engaging component 52 is fixedly connected to an output shaft of the rotating motor 51. A rotating shaft 53 is fixedly connected in the housing 1, located between the rotating motor 51 and the linkage lever 4, and rotatably connected to a second engaging component 54, and the second engaging component 54 is engaged with the first engaging component 52.

Referring to FIG. 4, in this embodiment, the first engaging component 52 is a worm, and the second engaging component 54 is a worm helical gear. Since teeth of the worm are continuous and helical teeth, when the worm and the worm helical gear are engaged with each other, they gradually become engaged or disengaged. Meanwhile, there are a plurality of engaging tooth pairs, therefore, there will be a low impact load, a smooth transmission, and a low noise. In other embodiments, the first engaging component 52 and the second engaging component 54 may be staggered gears, such as a bevel gear or a helical gear.

Referring to FIG. 4, to rotate the linkage lever 4, a third engaging component 55 is rotatably connected to the rotating shaft 53, and synchronously rotated when the second engaging component 54 is rotated. In this embodiment, the third engaging component 55 and the second engaging component 54 are integrally molded; and in other embodiments, the third engaging component 55 and the second engaging component 54 may be two independent structures, and connected to each other, so that the second engaging component 54 may rotate the third engaging component 55 synchronously.

To stably rotate the second engaging component 54 and the third engaging component 55, in this embodiment, the second engaging component 54 and the third engaging component 55 may be connected to the rotating shaft 53 via pads sleeved at both two ends of the rotating shaft 53, respectively, so that an end of the second engaging component 54 and an end of the third engaging component 55 abut against the pads, thereby limiting the second engaging component 54 and the third engaging component 55 along an axial direction; and in other embodiments, there are some steps provided at two ends of both the second engaging component 54 and the third engaging component 55, and bearings are mounted on the steps, so that the periphery of the bearings is fixed on the housing 1, so as to limit an axial movement of both the second engaging component 54 and the third engaging component 55.

Referring to FIG. 2 and FIG. 4, in two groups of the first transmission components 31, the first transmission component 31 in the housing 1 configured to connect to the rotating motor 51 includes a face tooth 311 and a helical tooth 312, and the first transmission component 31 of another housing 1 only includes a face tooth 311. The helical tooth 312 is rotatably connected in the housing 1, connected to an end of the linkage lever 4, and is engaged with the third engaging component 55, the third engaging component 55 and the helical tooth 312 are helical gears, and the face tooth 311 is engaged with the second transmission component 32.

To ensure that the helical tooth 312 may synchronously rotates the face tooth 311, in this embodiment, the face tooth 311 and the helical tooth 312 are integrally molded together, and supported by the housing 1 and the bearings at two ends of both the face tooth 311 and the helical tooth 312; and in other embodiments, the face tooth 311 and the helical tooth 312 may be two independent structures, and the face tooth 311 is fixedly connected to the helical tooth 312. Each of the face tooth 311 and the helical tooth 312 is defined with a non-circular hole 56, the linkage lever 4 has a cross section matching with the non-circular hole 56, so that it can be inserted and fixed in the non-circular hole 56. In other embodiments, the linkage lever 4 and the first transmission component 31 may be integrated with each other or connected to each other via a fastener.

Secondly, the rotating shaft 53 is obliquely provided, thereby preventing an interference between the second engaging component 54 and face tooth 311, while ensuing a better engagement of the third engaging component 55 with the helical tooth 312. Since the rotating shaft 53 is oblique, the third engaging component 55 is also oblique, therefore, the helical tooth 312 is applied with a force toward the face tooth 311 when the third engaging component 55 is engaged with the helical tooth 312, so that the linkage lever 4 is more stable and balanced when the face tooth 311 is engaged and rotated with the second transmission component 32.

Figure 5:
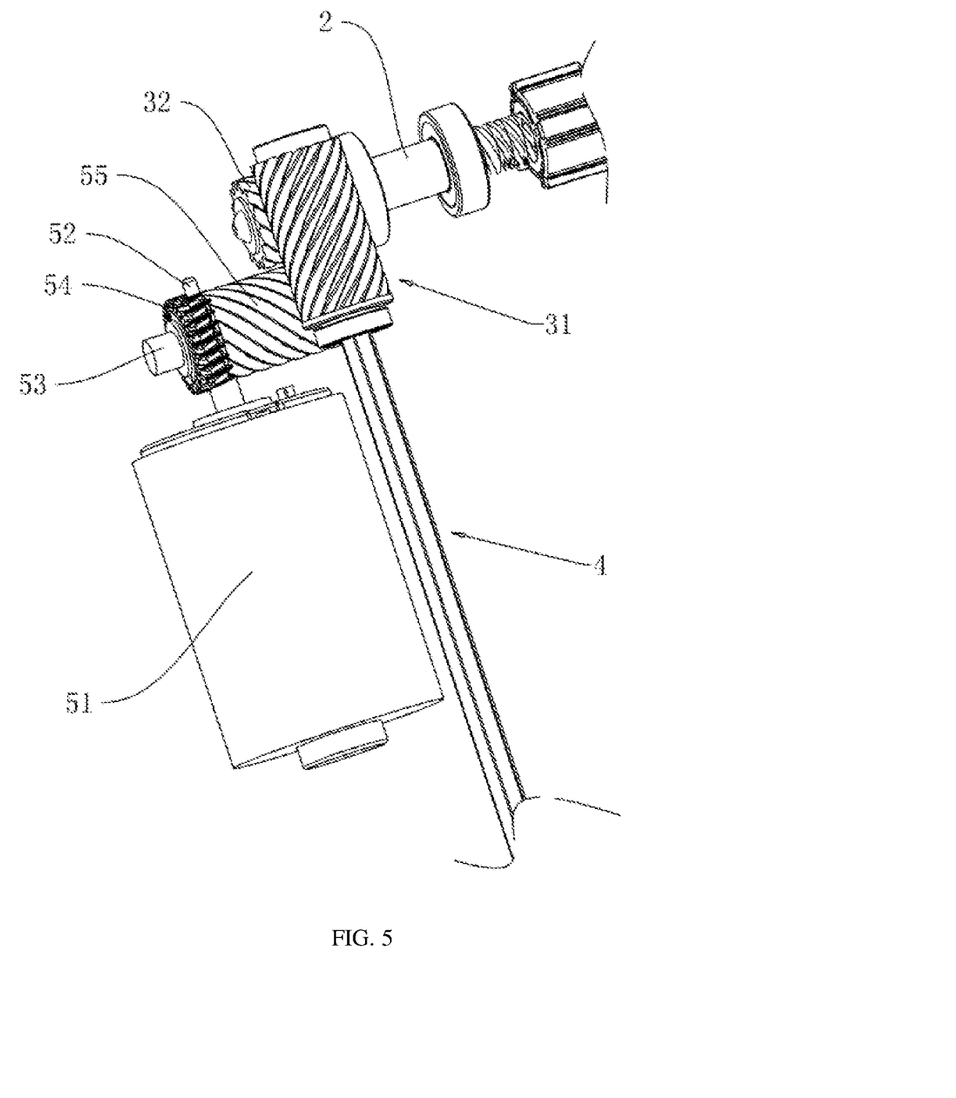
FIG. 5 is a schematic illustration of a first transmission component as another implementation way in Embodiment 1.

Referring to FIG. 5, in other embodiments, the first transmission component 31, the second transmission component 32 and the third transmission component 55 are both helical gears, and the first transmission component 31 and the second transmission component 32 are engaged with the third transmission component 55 at the same time, which can deliver a larger and more smooth force. The first transmission component 31 and the second transmission component 32 can be made of plastic, so that the device may be lighter and cheaper.

Referring to FIG. 4, in this embodiment, when the third engaging component 55 rotates the helical tooth 312, the linkage lever 4 is rotated and synchronously rotates the face tooth 311 at two ends of the linkage lever 4, and the second transmission components 32 from the other housing 1 is synchronously rotated, so that the two telescopic mechanisms 2 may be synchronously ascended or descended.

When the second transmission component 32 in one of the housings 1 adopts a face tooth, the second transmission component 32 of the other housing 1 also adopts a face tooth having a same speed reducing ratio and a same number of teeth. In other embodiments, when the second transmission component 32 in one of the housing 1 is a helical gear, the second transmission component 32 in the other housing 1 is a helical gear having a same speed reducing ratio and a same number of teeth.

Referring to FIG. 2, in this embodiment, the linkage lever 4 includes two connecting rods 41 connected to two housings 1 respectively, in which ends of two connecting rods 41 departing from the housing 1 are both connected to a flexible coupling 42, one end of the connecting rod 41 departing from the flexible coupling 42 is connected to the helical tooth 312, and the flexible coupling 42 adopts a plum flexible coupling or a universal coupling, so that the two connecting rods 41 have higher concentricity, and the noise is reduced; in other embodiments, the linkage lever 4 may be a rigid rod; and in other embodiments, the linkage lever 4 may be a flexible rod, preferably a soft shaft.

Figure 6:
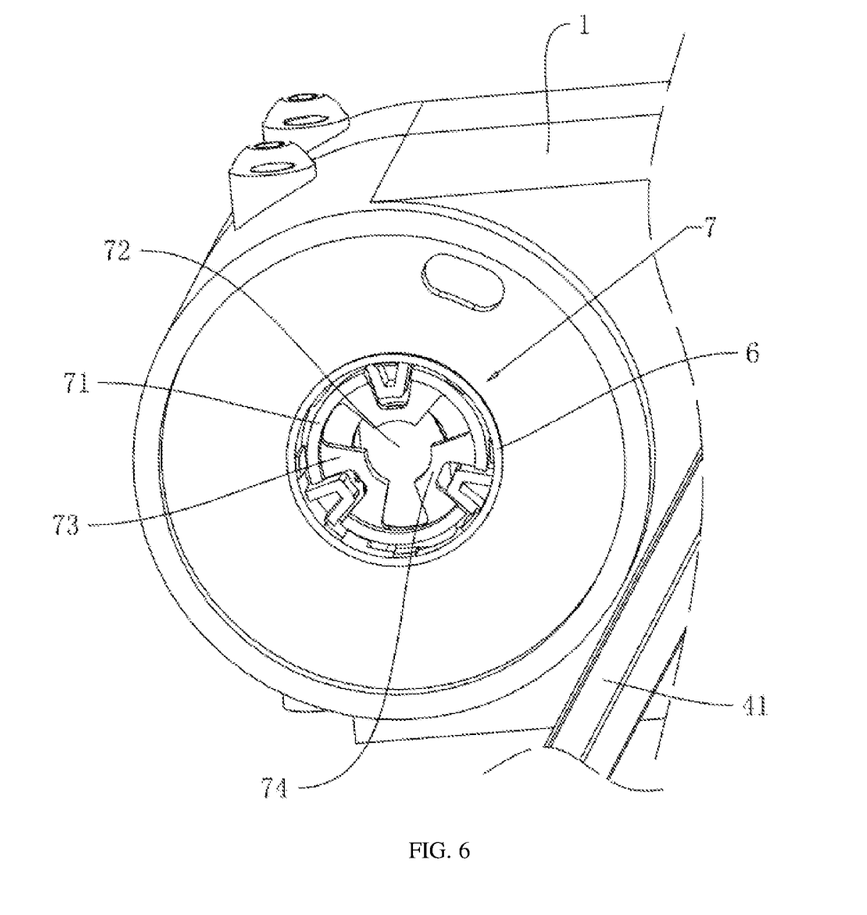
FIG. 6 is a schematic illustration of a braking component in Embodiment 1.

Referring to FIG. 6, to ensure a more stable brake of the motor, in this embodiment, a side wall of the housing 1 configured to connect to rotating motor 51 is defined with a receiving groove 6, the receiving groove 6 has a circular cross section, a braking component 7 is fixed in the receiving groove 6, an output shaft of the rotating motor 51 is passed through the receiving groove 6 and inserted into the housing 1, and the braking component 7 may be sleeved on the output shaft of the rotating motor 51.

Referring to FIG. 6, the braking component 7 includes a ring substrate 71 fixed in inner wall of the receiving groove 6, the ring substrate 71 is of a ring shape. The inner wall of the ring substrate 71 is integrally connected with at least three braking components, in which three braking components are equidistantly arranged and provided along a circumference of the ring substrate 71, so that the three braking components form a central opening 72 for the output shaft of the rotating motor 51 to pass through, and the three braking components abut against the output shaft of the rotating motor 51.

Referring to FIG. 6, the braking component includes two connecting portions 73 integrally connected to an inner wall of the ring substrate 71, the connecting portion 73 is radial provided along the ring substrate 71, a braking portion 74 is connected to an end of the two connecting portions 73 adjacent to the central opening 72, and a side of the braking portion 74 facing the output shaft of the rotating motor 51 is of an arc shape, so that the braking portion 74 may abut on an side wall of the output shaft of the rotating motor 51. Furthermore, the braking component is elastic and may be made of a heat-resisting plastic such as PEEK, therefore the braking portion 74 may supply a braking force opposite to a rotation direction of the output shaft of the rotating motor 51 via a friction force between the braking portion 74 and the output shaft of the rotating motor 51.

An implementing principle of above embodiment is as follows. When in use, two housings 1 are connected to a fixed end of an electrical furniture, two telescopic mechanisms 2 are connected to a telescopic end or rotating end of the electrical furniture, parallel to each other and arranged at two sides of the electrical furniture, respectively, so that the electrical furniture is driven by controlling expansion and contraction of the telescopic mechanism 2, so as to improve a stability of the driving. The present application is not only applicable to the field of an electrical furniture, but also applicable to an intelligent office equipment (such as a lifting table), or an electrical medical equipment (such as an electrical medical bed). When two telescopic mechanisms 2 need to ascend or descend synchronously, the rotating motor 51 is started, so that the output shaft of the rotating motor 51 rotates the first engaging component 52 and the second engaging component 54, the second engaging component 54 rotates the third engaging component 55, the third engaging component 55, due to engagement with the helical tooth 312, rotates the connecting rod 41 connected to the helical tooth 312, one of the connecting rods 41 synchronously rotates the other connecting rod 41 via a flexible coupling 42, two connecting rods 41 synchronously rotates two face teeth 311, the face teeth 311 rotate the second transmission components 32, so that the screw rod is rotated around itself axial direction and drives the telescopic mechanism 2 to ascend or descend. Therefore, two telescopic mechanisms 2 can be synchronously driven to ascend or descend via only one rotating motor 51, reducing a cost, providing a higher synchronous coefficient, and ensuring a more stable work for the electrical furniture.

Embodiment 2

Figure 7:
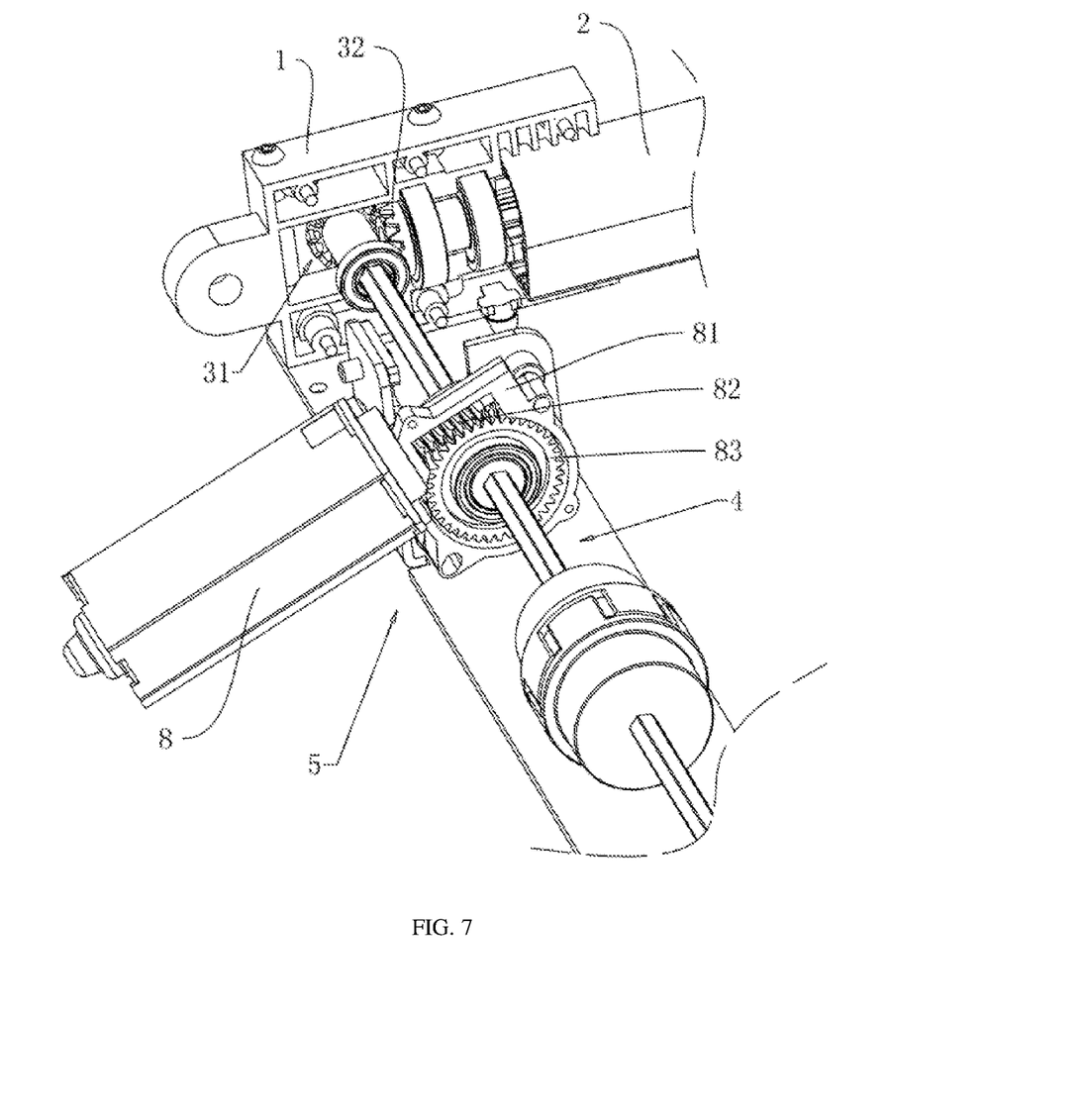
FIG. 7 is a schematic illustration of a drive mechanism in Embodiment 2.

Referring to FIG. 7, this embodiment differs from Embodiment 1 in that, a mounting plate mounted on an electrical furniture is connected to a mounting housing 81 via a screw, the mounting housing 81 is hollow, a drive mechanism 5 includes a driving motor 8 fixedly connected to the mounting housing 81. In this embodiment, the driving motor 8 is fixedly connected to the mounting housing 81 via a screw. An output shaft of the driving motor 8 is inserted into an inner cavity of the mounting housing 81 and connected to a first driving component 82, the linkage lever 4 is fixedly connected to a second driving component 83, and the second driving component 83 is engaged with the first driving component 82.

In this embodiment, the first driving component 82 is a worm, the second driving component 83 is a worm helical gear; and in other embodiments, the first driving component 82 and the second driving component 83 may be two bevel gears engaged with each other.

Embodiment 3

This embodiment differs from Embodiment 1 in that, a rotating shaft 53 is rotatably connected to a housing 1, two ends of the rotating shaft 53 are connected to a bearing, so that a periphery of the bearing is fixed on the housing 1, and a second engaging component 54 and a third engaging component 55 are both fixed on the rotating shaft 53. Therefore, the third engaging component 55 is synchronously rotated when the first engaging component 52 rotates the second engaging component 54, so that the linkage lever 4 may synchronously drive two telescopic mechanisms 2 to ascend or descend.

Embodiment 4

This embodiment differs from Embodiment 1 in that, a face tooth 311 may be substituted by a worm, the second transmission component 32 may adopt a worm helical gear, and the worm is engaged with the worm helical gear.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

1. Housing
2. Telescopic mechanism
3. Transmission mechanism
4. Linkage lever
5. Drive mechanism
31. First transmission component
311. Face tooth
312. Helical tooth
32. Second transmission component
51. Rotating motor
52. First engaging component
53. Rotating shaft
54. Second engaging component
55. Third engaging component
56. Non-circular hole
41. Connecting rod
42. Flexible coupling
6. Receiving groove
7. Braking component
71. Ring substrate
72. Central opening
73. Connecting portion
74. Braking portion
8. Driving motor
81. Mounting housing
82. First driving component
83. Second driving component

What is claimed is:
1. A one-motor-duel-drive synchronous drive device, comprising:
 a housing, wherein the housing is hollow, a telescopic mechanism is connected to the housing, the telescopic mechanism comprises a screw rod, and one end of the screw rod extends into the housing;

a transmission mechanism, wherein the transmission mechanism comprises a first transmission component rotatably connected to an inner wall of the housing, a second transmission component is fixedly connected to the screw rod, and the first transmission component and the second transmission component are staggered gears engaged with each other;

a linkage lever provided between the housing, wherein two ends of the linkage lever are connected to the first transmission component, respectively; and a drive mechanism configured to act on the linkage lever to rotate the linkage lever, wherein the drive mechanism is connected to a first end of the linkage lever and comprises a rotating motor, a first engaging component is fixedly connected to an output shaft of the rotating motor, a second engaging component is rotatably connected in the housing, the first engaging component is engaged with the second engaging component, a third engaging component is rotatably connected in the housing, and the third engaging component is fixedly connected to the second engaging component and engaged with the first transmission component.

2. The one-motor-duel-drive synchronous drive device according to claim 1, wherein the first transmission component comprises a face tooth and a helical tooth, the helical tooth is rotatably connected in the housing, fixedly connected to the face tooth, and engaged with the third engaging component, and the face tooth is engaged with the second transmission component.

3. The one-motor-duel-drive synchronous drive device according to claim 1, wherein the first transmission component is defined with a non-circular hole, the linkage lever is inserted and fixed in the non-circular hole, and the linkage lever has a cross section matching with the non-circular hole.

4. The one-motor-duel-drive synchronous drive device according to claim 1, wherein the linkage lever comprises connecting rods connected to the housing and a second housing, respectively, and a flexible coupling is connected between the connecting rods.

5. The one-motor-duel-drive synchronous drive device according to claim 1, wherein the linkage lever comprises a rigid rod or a flexible rod connected between the housing.

6. The one-motor-duel-drive synchronous drive device according to claim 1, wherein a braking component sleeved on the output shaft of the rotating motor is connected to the housing, and the braking component is elastic and configured for applying a braking force opposite to a rotating direction of the output shaft of the rotating motor to the output shaft of the rotating motor.

7. The one-motor-duel-drive synchronous drive device according to claim 1, wherein the drive mechanism comprises a driving motor, a first driving component is fixedly connected to an output shaft of the driving motor, a second driving component is fixedly connected to the linkage lever, and the first driving component is engaged with the second driving component.

8. The one-motor-duel-drive synchronous drive device according to claim 7, wherein the first driving component and the second driving component are staggered gears.

9. The one-motor-duel-drive synchronous drive device according to claim 1, wherein the first engaging component and the second engaging component are staggered gears.

* * * * *